(12) United States Patent
Ashibe et al.

(10) Patent No.: US 11,828,957 B2
(45) Date of Patent: Nov. 28, 2023

(54) DISPLAY APPARATUS AND CONTROL METHOD FOR DISPLAY APPARATUS

(71) Applicant: CANON KABUSHIKI KAISHA, Tokyo (JP)

(72) Inventors: Tsunenori Ashibe, Kanagawa (JP); Hidehiko Fujimura, Tokyo (JP); Hiroyuki Kubo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 17/502,513

(22) Filed: Oct. 15, 2021

(65) Prior Publication Data

US 2022/0036783 A1 Feb. 3, 2022

Related U.S. Application Data

(63) Continuation of application No. PCT/JP2020/015730, filed on Apr. 7, 2020.

(30) Foreign Application Priority Data

Apr. 25, 2019 (JP) .................................. 2019-084270
Mar. 30, 2020 (JP) .................................. 2020-061432

(51) Int. Cl.
*G02B 30/56* (2020.01)
*G06F 3/01* (2006.01)
(Continued)

(52) U.S. Cl.
CPC .............. *G02B 30/56* (2020.01); *G06F 3/011* (2013.01); *G09F 19/18* (2013.01); *G09G 3/003* (2013.01);
(Continued)

(58) Field of Classification Search
CPC ...... G09G 3/02; G09G 3/003; G09G 2354/00; G09G 3/00; G06F 3/011; G02B 26/101;
(Continued)

(56) References Cited

U.S. PATENT DOCUMENTS 6,860,779 B2   3/2005   Fujimura et al.
7,533,995 B2   5/2009   Momiuchi et al.
(Continued)

FOREIGN PATENT DOCUMENTS

JP   2003-233339 A   8/2003
JP   2005-309162 A   11/2005
(Continued)

OTHER PUBLICATIONS

Jun. 23, 2020 International Search Report in International Patent Appln. No. PCT/JP2020/015730.

*Primary Examiner* — Adam R. Giesy
(74) *Attorney, Agent, or Firm* — Venable LLP

(57) ABSTRACT

A display apparatus includes a laser radiation device, an object detection device, and a control device. The laser radiation device is configured to radiate laser light of a predetermined wavelength range to a display position in a gas to form a plasma in the display position. The object detection device is configured to detect presence or absence of an object in a predetermined space. The control device is configured to determine the predetermined space on a basis of the display position and intensity of the laser light scattered in the display position or having passed the display position.

20 Claims, 13 Drawing Sheets

(51) Int. Cl.
  *G09G 3/00* (2006.01)
  *G09G 3/02* (2006.01)
  *G09F 19/18* (2006.01)
  *G02B 26/10* (2006.01)

(52) U.S. Cl.
  CPC ............ *G09G 3/02* (2013.01); *G02B 26/101* (2013.01); *G09G 2354/00* (2013.01)

(58) Field of Classification Search
  CPC ......... G02B 30/56; G01S 17/04; G09F 19/12; H04N 5/74; H04N 9/31; H04N 13/324; H04N 13/388
  See application file for complete search history.

(56) References Cited

U.S. PATENT DOCUMENTS

| | | |
|---|---|---|
| 7,766,485 B2 | 8/2010 | Momiuchi et al. |
| 2005/0068999 A1 | 3/2005 | Momiuchi et al. |
| 2009/0213340 A1 | 8/2009 | Momiuchi et al. |
| 2016/0259298 A1* | 9/2016 | Farringdon ............ G02B 30/56 |
| 2017/0293259 A1* | 10/2017 | Ochiai ................. G02B 3/0006 |
| 2018/0352164 A1* | 12/2018 | Higuchi ................. G03B 21/14 |
| 2020/0184861 A1 | 6/2020 | Ashibe et al. |

FOREIGN PATENT DOCUMENTS

| | | |
|---|---|---|
| JP | 2007-133639 A | 5/2007 |
| JP | 2015-156080 A | 8/2015 |
| JP | 2017-007600 A | 1/2017 |

* cited by examiner

| LASER OUTPUT (mW) | VISUALLY RECOGNIZED COLOR | Y VALUE OF PLASMA/ Y VALUE NEAR LASER WAVELENGTH | x | y |
|---|---|---|---|---|
| 1000 | NO LIGHT EMISSION OBSERVED | NO VALUE | | |
| 1100 | VERY WEAK GREEN | 5% | 0.1685 | 0.7985 |
| 1200 | WEAK GREEN | 15% | 0.1785 | 0.7785 |
| 1500 | CLEAR GREEN | 24% | 0.1993 | 0.7044 |
| 2500 | BRIGHT GREEN | 35% | 0.2022 | 0.6547 |
| 3000 | GLARING GREEN | 60% | 0.2089 | 0.4923 |
| 4000 | VAGUE GREEN | 95% | 0.2153 | 0.4287 |
| 6000 | PALE COLOR | 120% | 0.2944 | 0.3852 |
| 12000 | PALE COLOR AND SPARKING SOUND | 200% | 0.2654 | 0.3122 |

FIG.13

| | MEASUREMENT ANGLE (°) | 20 | 30 | 45 | 90 | 135 | 225 | 270 | 315 | 330 | 340 |
|---|---|---|---|---|---|---|---|---|---|---|---|
| ONLY PLASMA LIGHT | X | 28904 | 28854 | 28827 | 28896 | 28844 | 28898 | 28893 | 28838 | 28894 | 28911 |
| | Y(Y1) | 57238 | 38428 | 36422 | 36328 | 36321 | 36346 | 36311 | 36451 | 38472 | 57231 |
| | Z | 57042 | 37813 | 34813 | 34718 | 34756 | 34781 | 34757 | 34839 | 37879 | 57014 |
| SCATTERED LIGHT OF VISIBLE LASER LIGHT | X | 29557 | 30023 | 30066 | 30133 | 30091 | 30101 | 30138 | 30078 | 30055 | 29533 |
| | Y(Y2) | 151609 | 153611 | 153613 | 153604 | 153551 | 153632 | 153674 | 153617 | 153669 | 151611 |
| | Z | 7307 | 7396 | 7401 | 7462 | 7444 | 7488 | 7479 | 7428 | 7388 | 7321 |
| (Y1/Y2)*100(%) | | 37.8 | 25.0 | 23.7 | 23.7 | 23.7 | 23.7 | 23.6 | 23.7 | 25.0 | 37.7 |
| LIGHT EMITTING BODY | X | 58461 | 58877 | 58893 | 59029 | 58935 | 58999 | 59031 | 58916 | 58949 | 58444 |
| | Y | 208847 | 192039 | 190035 | 189932 | 189872 | 189978 | 189985 | 190068 | 192141 | 208842 |
| | Z | 64350 | 45209 | 42214 | 42180 | 42200 | 42269 | 42236 | 42267 | 45267 | 64335 |
| | x | 0.1763 | 0.1988 | 0.2023 | 0.2028 | 0.2025 | 0.2026 | 0.2027 | 0.2023 | 0.1989 | 0.1762 |
| | y | 0.6297 | 0.6485 | 0.6527 | 0.6524 | 0.6525 | 0.6523 | 0.6523 | 0.6526 | 0.6483 | 0.6298 |
| | COLOR | SLIGHTLY BLUISH GREEN | GREEN | GREEN | GREEN | GREEN | GREEN | GREEN | GREEN | GREEN | SLIGHTLY BLUISH GREEN |

DISPLAY APPARATUS AND CONTROL METHOD FOR DISPLAY APPARATUS

CROSS-REFERENCE TO RELATED APPLICATIONS

This application is a Continuation of International Patent Application No. PCT/JP2020/015730, filed Apr. 7, 2020, which claims the benefit of Japanese Patent Application No. 2019-084270, filed Apr. 25, 2019, and Japanese Patent Application No. 2020-061432, filed Mar. 30, 2020 which are hereby incorporated by reference herein their entirety.

BACKGROUND OF THE INVENTION

Field of the Invention

The present invention relates to a display apparatus and a control method for the display apparatus.

Description of the Related Art

Conventionally, a technique of focusing a laser beam on a display position in the air to display an image has been proposed. For example, Japanese Patent Laid-Open No. 2015-156080 discloses a display method in which a plasma is locally formed by laser beam irradiation and plasma light thereof is used. In this technique, local electrical breakdown is generated in the air by irradiation with a laser beam of a wavelength of an invisible range to form a plasma state which is locally highly concentrated in the air, and thus flashing light (plasma light emission) is generated to perform light emission display. Display methods of this kind in which an image is displayed in the air by using a laser beam have potential to, for example, enable observation from various directions, and enable 2D display observable as a flat image or 3D display observable as a three-dimensional image, and are expected to be put in practical use.

Generally, in the case of using a laser beam, a measure needs to be taken to protect people or objects in the surrounding environment. Particularly, in the case of a display apparatus that causes plasma light emission by laser beam irradiation, irradiation with a laser beam of a relatively high output is needed, and it is demanded that a human body such as a skin or a retina, and objects in the environment and paint and coating thereon are reliably protected.

Japanese Patent Laid-Open No. 2015-156080 discloses a configuration in which display is stopped in the case where a pedestrian or another vehicle is detected in a target position (position where the laser beam is focused to cause plasma light emission) when the laser beam is focused on the target position in front of a vehicle to perform plasma light emission display.

According to a method in which display is stopped in the case where a pedestrian or another vehicle is detected in a target position (position where a laser beam is focused to cause plasma light emission) as in Japanese Patent Laid-Open No. 2015-156080, the laser beam being directly focused on the pedestrian or the other vehicle can be prevented.

However, in the example of Japanese Patent Laid-Open No. 2015-156080, although direct focus (radiation) of the laser beam on the pedestrian can be prevented, protection of an observer (the driver of an automobile in the case of Japanese Patent Laid-Open No. 2015-156080) that visually recognizes the displayed image is not considered. In addition, according to the method of Japanese Patent Laid-Open No. 2015-156080, depending on the conditions of the surroundings, there is a possibility that stoppage of display occurs frequently, and thus the practicality for the observer (driver) is degraded.

Therefore, a method that can appropriately protect the observer and can suppress the frequency of display stoppage performed for observer protection when performing display by using a laser beam of an output high enough to generate a plasma in a gas has been desired.

SUMMARY OF THE INVENTION

According to a first aspect of the present invention, a display apparatus includes a laser radiation device configured to radiate laser light of a predetermined wavelength range to a display position in a gas to form a plasma in the display position, an object detection device configured to detect presence or absence of an object in a predetermined space, and a control device configured to determine the predetermined space on a basis of the display position and intensity of the laser light scattered in the display position or having passed the display position.

According to a second aspect of the present invention, a control method for a display apparatus includes detecting in which an object detection device detects presence or absence of an object in a predetermined space determined on a basis of the display position and intensity of the laser light scattered in the display position or having passed the display position, and controlling in which, in a case where the object detection device has detected the object in the predetermined space, a control device stops or reduces an output of the laser radiation device and changes a position or a shape of the predetermined space. The display apparatus includes a laser radiation device configured to radiate laser light of a predetermined wavelength range to a display position in a gas to form a plasma in the display position.

Further features of the present invention will become apparent from the following description of exemplary embodiments with reference to the attached drawings.

BRIEF DESCRIPTION OF THE DRAWINGS

FIG. 12 is a table diagram showing an observed color of the light emitting body formed in the air by the laser of the wavelength of 532 nm and the ratio of Y value of the plasma light emission/Y value near the laser wavelength at that time in the display apparatus according to the embodiment of the present invention for each laser output.

FIG. 13 is a table diagram showing details of visually recognized observed color of the light emitting body formed in the air by a green laser and the ratio of Y value of the plasma light emission/Y value near the laser wavelength at that time in the display apparatus according to the embodiment of the present invention for each measurement angle.

DESCRIPTION OF THE EMBODIMENTS

An embodiment of the present invention will be described below with reference to attached drawings. To be noted, the following configuration is merely an example, and for example, detailed elements thereof can be appropriately modified by one skilled in the art within the concept of the present invention. In addition, numerical values mentioned in the present embodiment are examples.

Embodiment (Laser Radiation Device)

In an image display apparatus (image forming apparatus) of the present embodiment, a laser of a predetermined wavelength range, particularly visible light range is used, and mainly the light emission color thereof is visually recognized by an observer. While there are various opinions about this predetermined wavelength range, that is, the visible light range, and it is considered that there are individual differences among observers, in the present embodiment, a wavelength range from 380 nm to 780 nm is considered as the visible light range for the sake of convenience. However, it goes without saying that approximately the same effect can be also obtained by implementing configurations or control similar to examples described below in a predetermined wavelength range (visible light range) differing from exemplified numerical values below by 0 to several tens of nanometers.

In the case of the present embodiment, the color to be displayed in the air, that is, in the atmospheric gas (atmosphere) is the color of the laser to be used in the visible light range. In principle, by forming light emitting bodies that respectively emit red, green, and blue light in the same or close positions in the air, full-color display pixels can be realized, and a three-dimensional image having a three-dimensional feel can be expressed by forming a large number of display pixels. In the present embodiment, a configuration and control for realizing a display pixel by monochromatic laser light, which serves as the basis for realizing these full-color display pixels, are used.

As the laser used for display, a high-output laser, that is, a short pulse laser is preferable. As the short pulse laser, a solid laser, a fiber laser, a semiconductor laser, a gas laser, and so forth are known. Among these, for example, the solid laser and the fiber laser, which have good laser stability, are preferable.

(Mechanism of Color Image)

Figure 1:
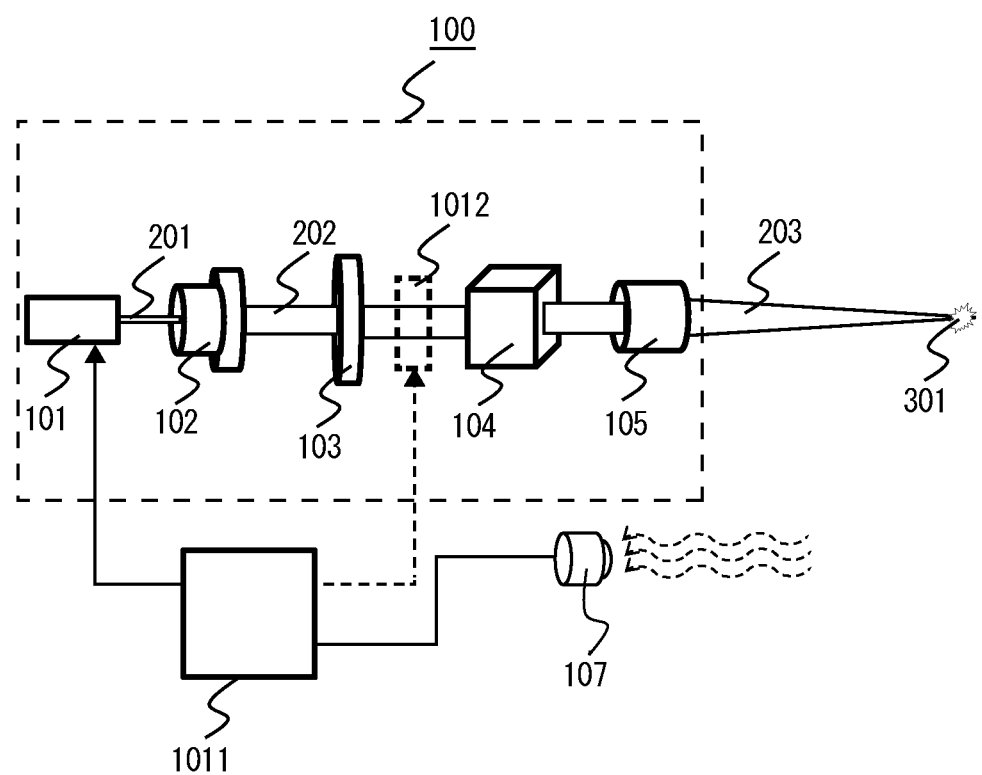
FIG. 1 is an explanatory diagram illustrating a schematic configuration of a display apparatus according to an embodiment of the present invention.

Here, the mechanism of generation of a color image (light emitting body) of the present embodiment will be described. FIGS. 1 to 4 illustrate a schematic configuration of a display apparatus (image forming apparatus) of the present embodiment. In FIG. 1, a laser light source 101 is a visible light laser light source that will be described later, and a laser beam 201 radiated from this visible light laser light source is used for generating a display pixel at a display position 301.

When a display pixel is generated, the observer visually recognizes the display pixel as if a light emitting body has appeared in the display position. However, as will be described later, a large part of the light reaching from the display position and visually recognized by the observer is not light emitted from the display position but laser light of the visible wavelength range scattered in the display position. That is, laser light of the visible wavelength range output from the laser light source generates a weak plasma in the display position, and the laser light is scattered by the plasma and reaches the observer. This is visually recognized by the observer as if a light emitting body has appeared, and therefore, in the present description, a small spatial region in which the laser light of the visible wavelength range is strongly scattered in the display position may be referred to as a light emitting body in some cases. To be noted, in the present description, a color displayed in the display position other than white may be referred to as a color (or colored) in some cases. In addition, although white plasma light or the like may be referred to as no color in table diagrams or the like for the sake of convenience, this does not mean the plasma light is invisible, but merely means that this is not the color (or is not colored as) described above.

The laser radiation device 100 illustrated in FIG. 1 includes a laser light source 101, a beam expander 102, a polarizing plate 103, a beam splitter 104, and a condenser lens 105 (focusing device). The laser light source 101 of FIG. 1 oscillates a laser beam 201 of a visible light range, for example, a wavelength of 532 nm. This laser beam is visually recognized as mostly green when recognized through the eyes. This laser beam 201 is incident on an optical path illustrated in FIG. 1. This optical path is constituted by, for example, the beam expander 102 that increases the laser light diameter, the polarizing plate 103, the beam splitter 104 (polarized beam splitter), and the condenser lens 105. This optical path is adjusted such that a laser beam 203 is focused on a display position at a predetermined distance, for example, a display position that is 90 mm from the distal end of the condenser lens 105. The beam expander 102 increases the diameter of the laser beam 201 by, for example, about 10 times, and thus obtains a laser beam 202. To be noted, the beam expander 102 of a different magnification may be used for the purpose of, for example, changing the magnification in accordance with the focal length.

In the display apparatus (image forming apparatus) of the present embodiment, as illustrated in FIG. 1, a living body sensor 107 is provided as an object detection device. This object detection device (living body sensor 107) detects presence or entrance of an object (living body) inside a specific spatial region, for example, a protection space 404 that will be described later. The system of the living body sensor 107 is not particularly limited as long as presence or entrance of a living body can be detected. For example, a sensor that utilizes electrostatic capacitance distribution or reflection of infrared light, an optical sensor that radiates detection light (infrared light or the like) in a matrix shape into the space and detects entrance of an object (living body) by blockage thereof, or the like can be used.

In FIG. 1, the radiation intensity of the laser light from the laser light source 101 is controlled by a control portion 1011. The control portion 1011 can control the light emission intensity of the laser light from the laser light source 101 by, for example, controlling the driving power of the laser light source 101. In addition, the control portion 1011 can control the radiation intensity of the laser light by changing the combination of the polarization direction of the polarizing plate 103 and the beam expander 102 as will be described in detail in a second embodiment. In addition, another control means such as one denoted by 1012 in FIG. 1 may be provided. This control means 1012 can be constituted by an element whose light transmittance can be changed such as a liquid crystal shutter.

Figure 5:
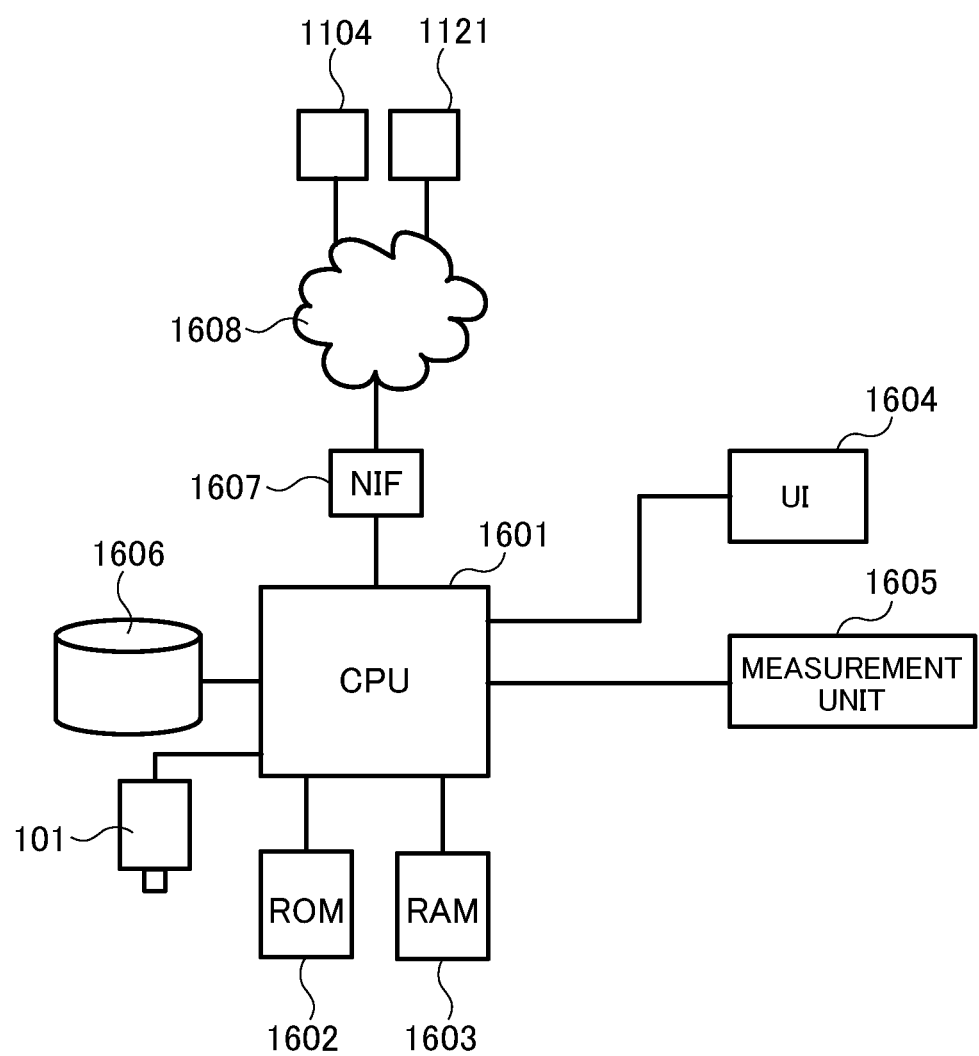
FIG. 5 is a block diagram illustrating a detailed configuration example of a control system of the display apparatus according to the embodiment of the present invention.

Here, FIG. 5 illustrates an example of a specific configuration of a control system constituting the control portion 1011. The control system of FIG. 5 can be constituted by, for example, PC hardware including a CPU 1601 serving as a main control means, a ROM 1602 serving as a storage device, and a RAM 1603. The ROM 1602 can store control programs and constant information for the CPU 1601 to realize a control procedure that will be described later. In addition, the RAM 1603 is used as a work area or the like for the CPU 1601 when executing a control procedure thereof. In addition, the control system of FIG. 5 is connected to an external storage device 1606. The external storage device 1606 is not necessary for implementation of the present invention, and can be constituted by an HDD, an SSD, an external storage device of another system that is network-mounted, or the like.

The control program for the CPU 1601 to realize laser output control of the present embodiment can be stored in a storage portion such as the external storage device 1606 described above, or (for example, an EEPROM region of) the ROM 1602. In this case, the control program for the CPU 1601 to realize the control procedure of the present embodiment can be supplied to each storage portion described above and updated to a new (different) program via a network interface 1607 (NIF). Alternatively, the control program for the CPU 1601 to realize the control procedure that will be described later can be supplied to each storage portion described above and updated via storage means such as various magnetic disks, optical disks, and flash memories and drive devices thereof. Various storage means, storage portions, and storage devices in the state of storing the control program for the CPU 1601 to realize the control procedure of the present embodiment constitute a computer-readable recording medium storing the control procedure of the present invention.

The CPU 1601 is connected to the laser light source 101 of FIG. 1. Although the laser light source 101 is illustrated as being directly connected to the CPU 1601 in FIG. 5 for simplicity, the laser light source 101 may be connected via a known interface or the like. In addition, the laser light source 101 may be connected via a network interface 1607 and a network 1608.

The network interface 1607 can be constituted by, for example, using a communication standard of wired communication such as IEEE 802.3 or a communication standard of wireless communication such as IEEE 802.11 or 802.15. The CPU 1601 can communicate with other apparatuses 1104 and 1121 via the network interface 1607. The apparatuses 1104 and 1121 correspond to, for example, an integral control device and a management server, and perform control and logging related to performance using display by the present display apparatus.

In addition, the control device of FIG. 5 includes a UI device 1604 (user interface device). This UI device 1604 is constituted by an operation portion and a display device. The operation portion can be constituted by a terminal such as a handy terminal, or a device such as a keyboard, jog dial, or pointing device (or a control terminal including these). In addition, as the display device, for example, in addition to a liquid crystal system, a display device of an arbitrary system can be used as long as display output is possible.

The display device of the UI device 1604 can display, on a monitor, various data related to driving conditions of the laser light source 101. In addition, an image corresponding to the three-dimensional image displayed in the air by the laser display apparatus of the present embodiment can be three-dimensionally displayed on a screen of the display device of the UI device 1604. In this case, the data and the like related to the driving conditions of the laser light source 101 and the like described above may be displayed along with the three-dimensional display corresponding to the three-dimensional image displayed in the air.

Figure 4:
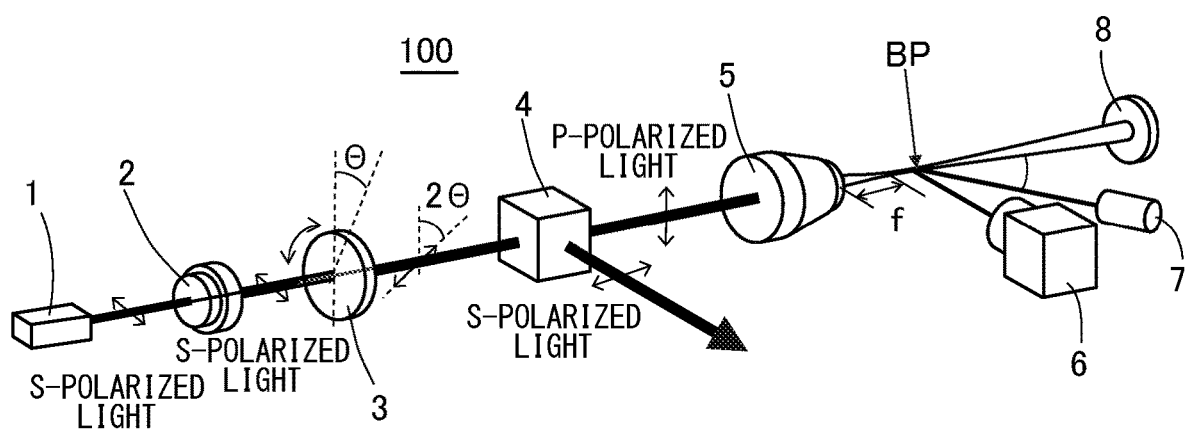
FIG. 4 is an explanatory diagram illustrating the configuration example of the display apparatus according to the embodiment of the present invention in detail.

In FIG. 5, a measurement unit 1605 corresponds to a measurement system constituted by a high-speed camera 6, a spectrometer 7 (108 of FIG. 2), a colorimeter 8, and so forth of FIG. 4. The measurement unit 1605 can be used for, for example, the CPU 1601 to determine the laser radiation intensity by closed loop control. The high-speed camera 6, the spectrometer 7, and the colorimeter 8, and the like constituting the measurement unit 1605 will be described later.

Figure 2:
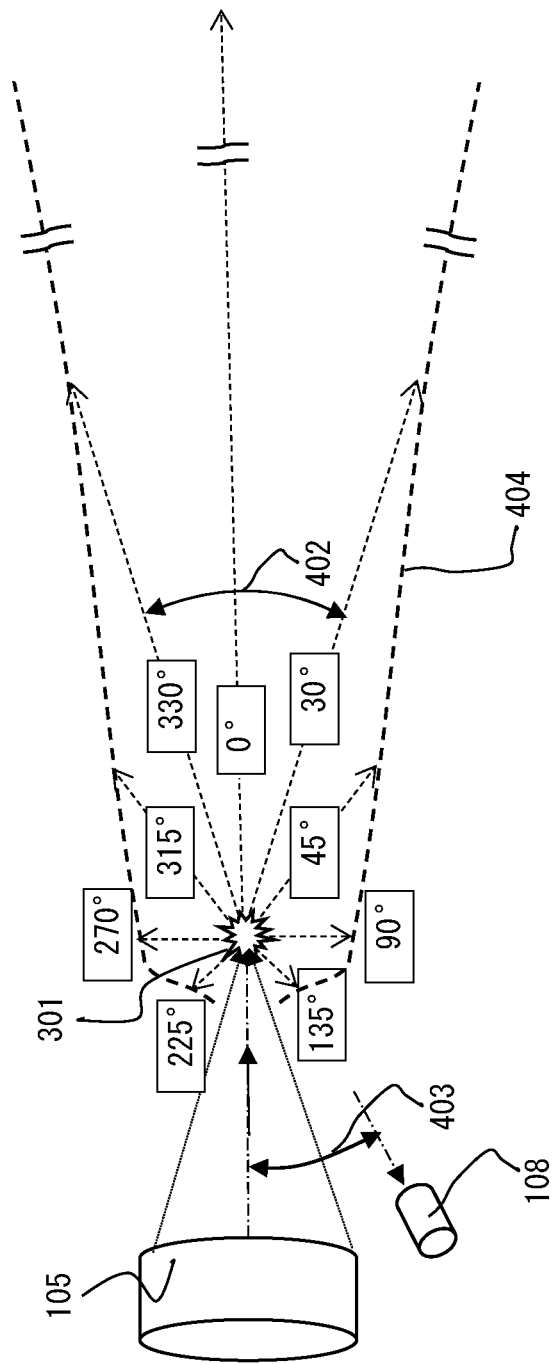
FIG. 2 is an explanatory diagram illustrating each radiation direction and position when a light emitting body is formed in the air by a laser of a predetermined wavelength in the display apparatus according to the embodiment of the present invention and the radiant energy density is measured by a spectrometer.

FIG. 2 illustrates how measurement is performed by the spectrometer 108 at observation angles of 0°, 30°, 45°, 90° . . . arranged clockwise in FIG. 2 while setting the radiation direction (optical axis direction) of the condenser lens 105 as 0°. Meanwhile, in FIG. 4, the laser light source 101, the beam expander 102, the polarizing plate 103, and the beam splitter 104 of FIG. 1 are respectively denoted by reference signs of 1, 2, 3, and 4. Here, by adjusting the radiation energy of the output of the laser by the polarizing plate 103 (3) and the beam splitter 104 (4), it has been confirmed that an observation region where a light emitting body (spatial region where laser light is strongly scattered) of the light emission color of the laser light source 101, for example, green, is visually recognizable is present in the display position 301 (BP).

Figure 8:
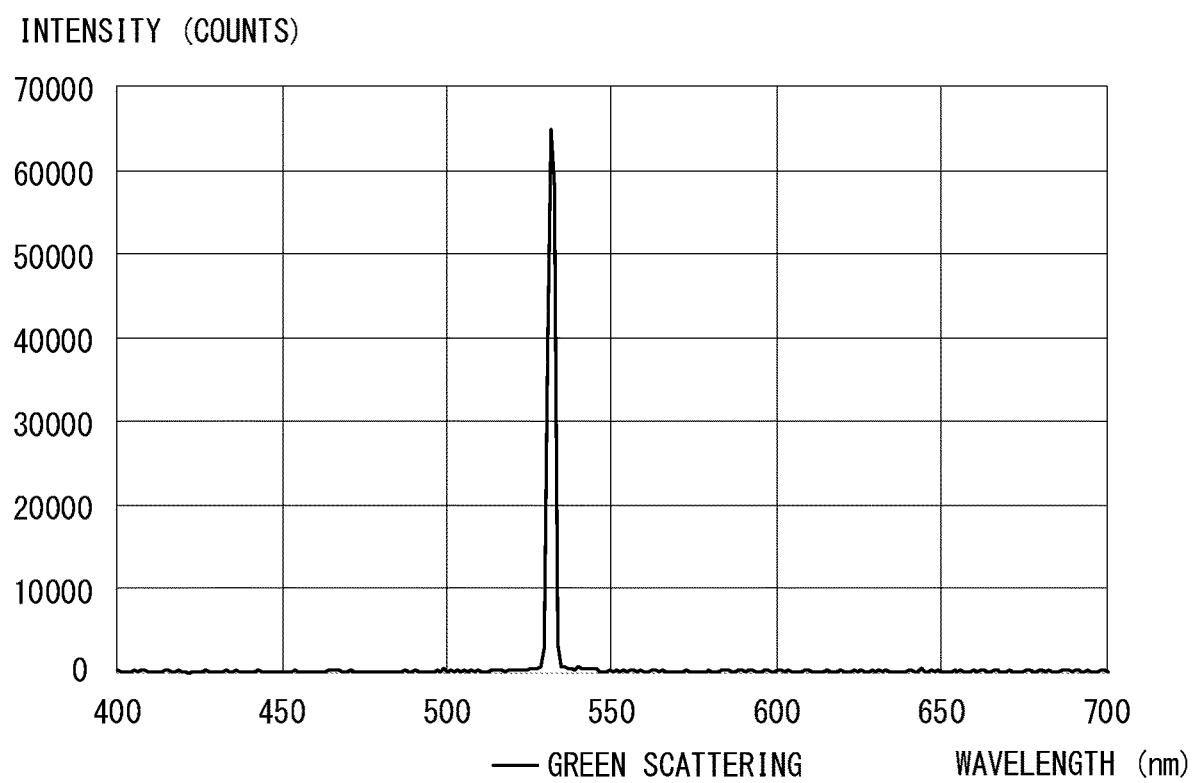
FIG. 8 is a graph illustrating a spectrum measured for 200 ms by a spectrometer in a position at 45° from a radiation direction in a case where a light emitting body is formed in the air by a laser of a wavelength of 532 nm in the display apparatus according to the embodiment of the present invention.

Particularly, by measuring the green light emitting body by a spectrometer (for example, AvaSpec-ULS2048CL manufactured by Avantes) for 200 ms in a position of 50 mm from the light source and a measurement angle of 45° in FIG. 2 in the case of a laser output of 1500 mW, a spectrum illustrated in FIG. 8 was obtained. In the spectrum of FIG. 8, light near 532 nm, which is of the light source, is more strongly detected than in other wavelength ranges, and this matches the green display color visually recognized by the observer in this display (observation) direction.

Figure 9:
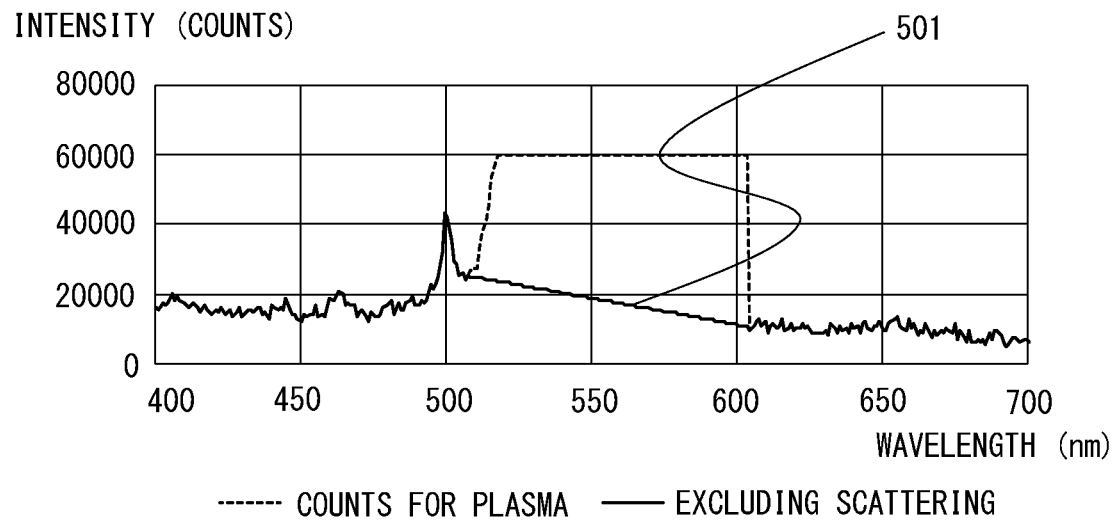
FIG. 9 is a graph illustrating a spectrum measured for 10000 ms by a spectrometer in a position at 45° from the radiation direction in the case where a light emitting body is formed in the air by the laser of a wavelength of 532 nm in the display apparatus according to the embodiment of the present invention.
Figure 10:
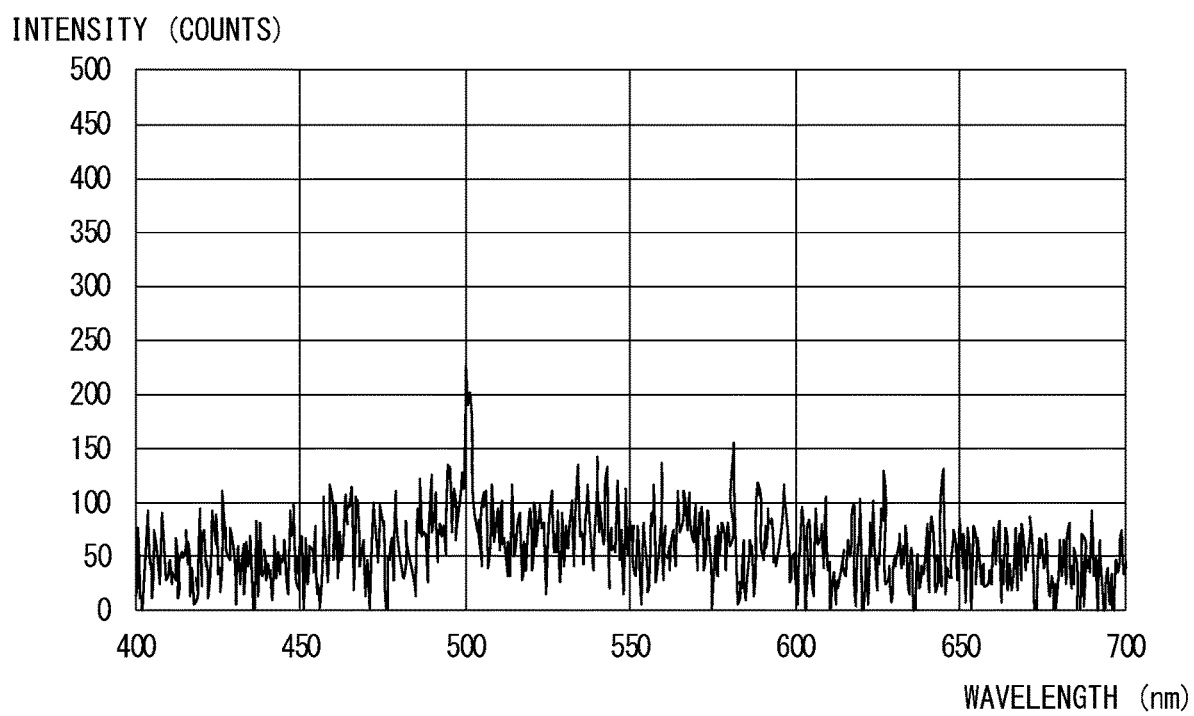
FIG. 10 is a graph illustrating a spectrum obtained by measuring a plasma formed in the air by the laser by the spectrometer.

However, to form a green light emitting body (spatial region where laser light is strongly scattered) by focusing green (532 nm) laser light, a predetermined condition is required. For example, as can be seen from the spectrometry measurement data of FIG. 8, slight light emission is included also in other visible light regions. Since this light is weak, spectrometry measurement was performed for 10000 ms (10 seconds), and the result thereof is illustrated as a graph in FIG. 9. From this FIG. 9, it can be seen that light is generated in a relatively wide visible light range. Meanwhile, FIG. 10 illustrates measurement of plasma light emission of such an intensity that an impact sound is generated together with flashing light that can be seen in Japanese Patent Laid-Open No. 2015-156080. Comparing FIG. 9 with FIG. 10, the shapes of the waveform are similar, and it can be considered that weak plasma light emission occurred in the measurement of the present embodiment illustrated in FIG. 9.

That is, it may be considered that one of conditions for forming a visually recognizable colored (for example, green) light emitting body in the air is to generate a weak plasma region in the air by controlling the output of visible laser light. This weak plasma can generate a light scattering field as a result of having a refractive index slightly different from that of a gas (air in the present embodiment), and it can be considered that colored (green) laser light is scattered by the scattering field, and thus the colored (green) light emitting body can be recognized. According to such a method of forming the light emitting body by using a weak plasma, in a normal office environment, the apparatus can be used for similar applications to normal display apparatuses such as liquid crystal displays while hardly making a noise caused by plasma generation.

The inventors conducted an experiment on conditions of combinations of the light emission intensity of the plasma light and the light emission intensity of scattering of the visible laser light, and results illustrated in FIG. 12 were obtained. In this experiment, the ratio of the Y value of light emission of only the plasma light and the Y value of the scattered light of the visible laser light excluding the plasma light obtained by converting the light emission intensity per wavelength of 1 nm into XYZ tristimulus values of CIE1931 were evaluated in a wavelength range from 380 nm to 780 nm.

Further, according to the experiment by the inventors, as a condition for the observer to visually recognize the colored (for example, green) light emitting body, it was necessary to control the laser radiation condition such that the Y value of the light emission of only the plasma light is 1% to 95% of the Y value of the scattered light of the visible laser light excluding the plasma light. For example, it is considered that, in the case where the Y value of the light emission of only the plasma light is smaller than 1%, the scattering field of the plasma is weak, thus the scattering of laser light is also weak, and therefore it is difficult for the observer to see the colored scattered light. It is more preferably 25% or more, and in the case where it is 25% or more, the colored light emitting body is easier to visually recognize. In addition, in the case where the Y value of the light emission of only the plasma light is larger than 95%, the light emission intensity of the plasma is too high, thus the colored scattered light is overwhelmed by the intensity of the white light of the plasma, and even if colored light is mixed therein, this is recognized as white light by the observer. In the case of calculating the Y value of the scattered light of the visible laser light (FIG. 8: case of green) excluding the plasma light, the Y value of the scattered laser light itself of colored (green) laser light is measured. Therefore, in the case of using a laser of 532 nm, as an output of a spectrometer arranged as illustrated in FIG. 2, output data of ±10 nm from the laser wavelength (522 nm to 542 nm in this case) is used, and other output data is set as 0.

Since the Y value of the light emission of only the plasma light is small in a condition in which color is recognized, the plasma light can be recognized by integration by setting the measurement time to, for example, 10000 ms. However, in this measurement, since the colored laser light is relatively stronger, the base range of the light intensity of the colored laser light is expanded to from 515 nm to 603 nm as illustrated in FIG. 9, and the XYZ values calculated in this case include a large portion of laser light. This is because the laser light is so strong with respect to the plasma light that the laser light affects the wavelength range near the laser wavelength. At this time, even if only the light intensity of 532 nm is removed, since the light intensity of the base portion is too high, the Y value of only the plasma light cannot be obtained. Therefore, to calculate the Y value of only the plasma light, the waveform of a spectrum output from the spectrometer is checked to check for which wavelength the light intensity (count number in the apparatus of the present embodiment) is doubled on the longer-wavelength side within a range of 10 nm. In the experiment according to the present embodiment, the count number for 515 nm was 1061, and the count number for 505 nm was 521.

Next, the waveform of the spectrum output from the spectrometer is checked to confirm a wavelength for which the light intensity (count number in the apparatus of the present embodiment) is halved on the longer-wavelength side within a range of 10 nm. In the experiment according to the present embodiment, the count number for 603 nm was 1190, and the count number for 613 nm was 212. At this time, while the wavelength of the laser was 532 nm, the base range spread from the 515 nm to 603 nm, which is a wide range, due to integration.

If this is removed and counted as 0, the Y value obtained by calculation is smaller than that of the Y value of only the plasma light, and therefore a straight line 501 is drawn from the vicinity of 505 nm on the shorter wavelength side to the vicinity of 613 nm on the longer wavelength side in the waveform of FIG. 9 to obtain a waveform curve (for example, FIG. 10) of only the plasma light. Then, by using this straight line 501, values including a value for each 1 nm between 505 nm on the shorter wavelength side and 613 nm on the longer wavelength side are obtained from the count values thereof. In FIG. 9 of the present embodiment, since measurement was performed for a period 50 times longer than the measurement of colored laser light (FIG. 8), X, Y, and Z are calculated by using ⅟₅₀ of the count number of each wavelength to obtain the measurement value of the Y value of the plasma light emission.

In addition, in the case where the plasma light emission is intense, the measurement time does not have to be long in a condition in which the light intensity of the colored laser light is overwhelmed by the plasma light. Here, the XYZ values (tristimulus values) of CIE 1931 are indicators indicating the intensity of light of each wavelength in the visible light range using intensities of red, green, and blue colors experimentally calculated from the sensitivity of human eyes, and particularly the Y value is considered as an indicator indicating the brightness of a color.

In the present embodiment, the display state is evaluated not by the light intensity of each wavelength but by the XYZ tristimulus values because the state recognized as a color by the observer is important and because the XYZ tristimulus values are the most appropriate as means for human to express a color and light intensity.

Figure 7:
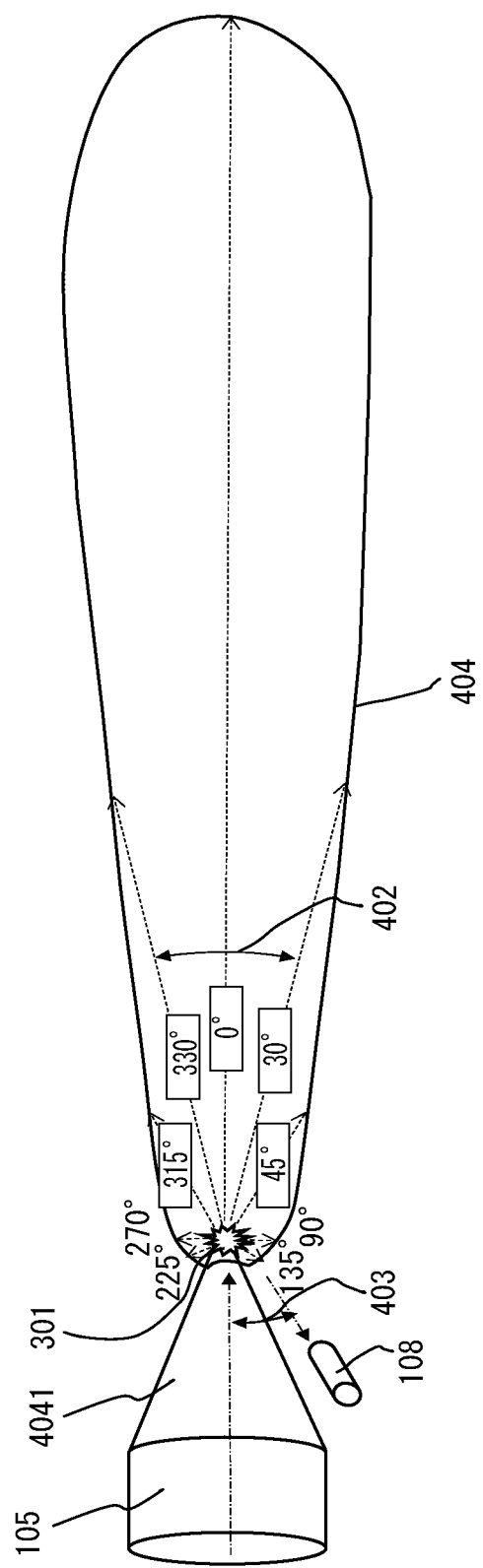
FIG. 7 is an explanatory diagram illustrating the shape of a space in which entrance of an observer or another object is restricted in the display apparatus of the embodiment of the present invention.

Next, direction dependence of the light reaching from the light emitting body will be discussed. In the present embodiment, a front scattering direction is a scattering angle in a range (402) of 0° or more and less than 30° and more than 330° and 0° (360°) or less with respect to the optical axis direction of the condenser lens 105 as illustrated in FIGS. 2 and 7. Meanwhile, in the present embodiment, a preferable display angle range in which the laser light scattered at the display position 301 can be observed at high color purity is a range excluding the front scattering direction (402) described above, that is, a range from 30° to 330° with respect to the optical axis direction of the condenser lens 105.

To be noted, a broken line illustrated in FIG. 2, or a solid line illustrated in FIG. 7 indicates the shape of an outer edge of the protection space 404 related to a protection mode that will be described later. The protection space 404 and the protection mode will be described in detail later with reference to FIGS. 6 and 7.

The present inventors have confirmed that when plasma light emission caused in the air in a light emission experiment of an invisible range laser is observed in the front scattering direction, the plasma light emitting body is not white but green. The wavelength of this green color is about 500 nm. This can be considered as a light emission color obtained when atoms or molecules of nitrogen or oxygen in the atmosphere are turned into a plasma. Although the reason why the color of the plasma light in the front scattering direction is green is unknown, according to this experiment, it has been revealed that the display direction (observation direction) is important in management of the display color.

For example, in the case of observing the light emitting body generated by the green laser irradiation in the front scattering direction, it can be considered that colors of light of 532 nm that is scattered laser light and light of about 500 nm of plasma light emission derived from the composition of the gas are mixed. As a result of this, the XY values of a light emission pixel vary even for the same green color, a light emission color different from an intended laser wavelength is obtained, and desired color expression becomes difficult. In addition, for a light emitting body generated by irradiation with different colored laser light (for example, red or blue), mixing of colors of plasma light emission of about 500 nm derived from the composition of the gas and scattered laser light occurs in the front scattering direction that is 0° or more and less than 30° and more than 330° and 360° or less with respect to the laser radiation direction. Therefore, there is a possibility that the purity of the display color is degraded.

Therefore, in the present embodiment, a range excluding the front scattering direction that is 0° or more and less than 30° and more than 330° and 360° or less with respect to the laser radiation direction is used as a display direction. As a result of this, the mixing of colors is suppressed, and the light emission color of the colored laser itself of the display apparatus can be observed as the display color by the user.

That is, in the present embodiment, in FIG. 2, the display direction is preferably set to 30° or more and 330° or less. For this, for example, in the optical axis arrangement of FIG. 2, the audience (observer group) that visually recognizes the display is disposed such that the light emitting body can be observed from only a range of 30° to 135° and 225° to 330°. Alternatively, in the optical axis arrangement of FIG. 2, a blocking device such as a blocking wall, a blocking plate, or a light shielding plate that restricts the view angle of the audience (observer group) that visually recognizes the display to a range of 30° to 135° and 225° to 330° is disposed.

By disposing such a blocking device, the light emission color of the colored laser itself of the display apparatus can be used as a display color without being affected by mixing of colors with light emission of the atmosphere caused by a plasma.

(Method of Spectrometry Measurement of Light Emitting Body)

The intensity of light of each wavelength from the light emitting body formed in the air as described above was measured from each measurement angle in FIG. 2 by using a spectrometer (for example, product name: AvaSpec-ULS2048CL manufactured by Avantes) as a measurement device. Since the intensity is very low for wavelengths other than the wavelength of the laser light, the measurement is performed for each 1 nm. To be noted, the value of the intensity of light of each wavelength output by the spectrometry is a count number, and, although the count number is different from luminance, the count number may be treated as light intensity, for example, as light intensity equivalent to spectral irradiance.

In this measurement, the measurement was performed for respective angles of 20°, 30°, 45°, 90°, 135°, 225°, 270°, 315°, 330°, and 340° while setting the laser radiation direction (optical axis direction of the condenser lens 105) as 0°. In addition, although FIG. 2 illustrates angles in a plane including the optical axis, the same applies to a case where, for example, arbitrary angles are selected in a circumferential direction of a circle around the optical axis are selected as angles at which measurement (the same applies to observation) is to be performed. As a matter of course, the angles in the circumferential direction at which this measurement (the same applies to observation) around the optical axis is to be performed should not limit the present invention.

(Calculation of XYZ Tristimulus Values of CIE and xy)

X, Y, and Z were calculated by substituting the count numbers of the wavelength range of 380 nm to 780 nm obtained by spectrometry measurement for values of CIE as a calculation method for the XYZ tristimulus values. As the calculation method, data is integrated for each 1 nm by using a color matching function of (CIE 1931 2-deg, XYZ CMFs). In addition, x, and y were calculated from X, Y, and Z, and calculation functions thereof are shown as formulae (1) and (2) below.

$$x = \frac{X}{X+Y+Z} \quad (1)$$

$$y = \frac{Y}{X+Y+Z} \quad (2)$$

Figure 11:
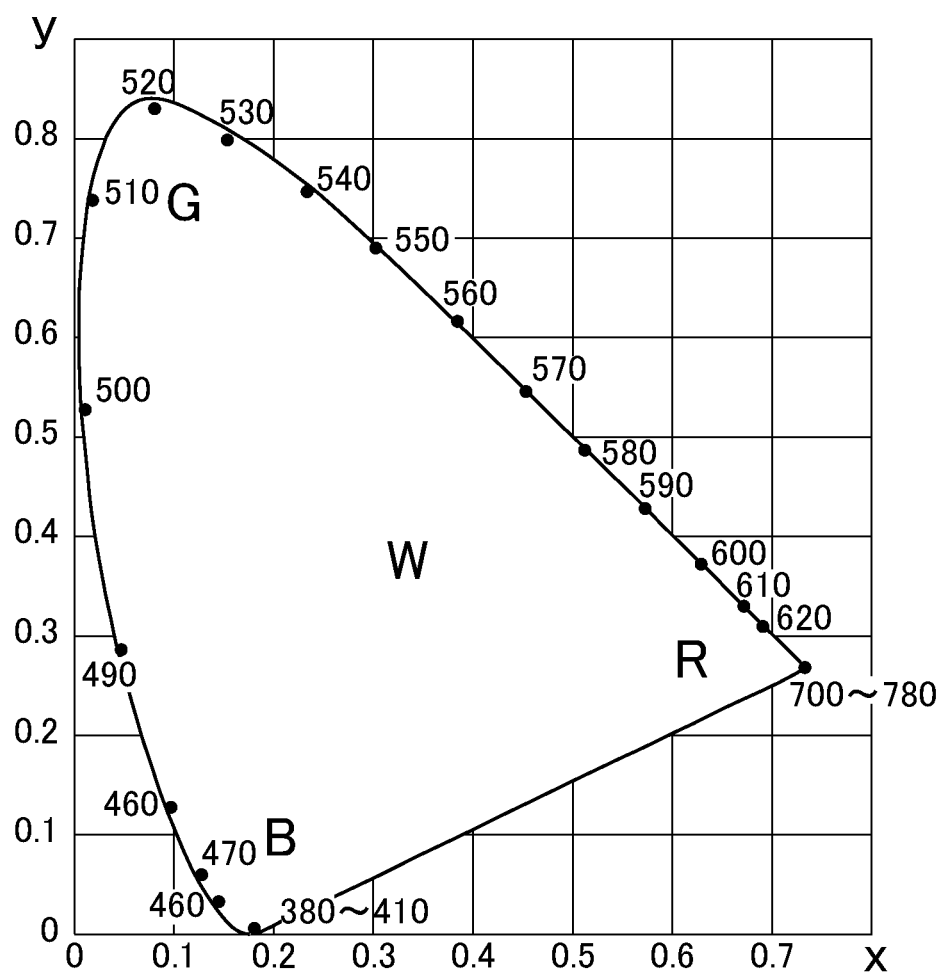
FIG. 11 is an explanatory diagram illustrating an XY chromaticity diagram of CIE 1931.

In the formulae (1) and (2) shown above, x and y represent a color, and the category of the color of the light emitting body of the present embodiment was determined by using a CIExy chromaticity diagram (FIG. 11). In the present embodiment, as determination by the xy chromaticity diagram (FIG. 11), white (achromatic color) was determined in a range in which x was 0.24 to 0.40 and y was 0.24 to 0.41. In addition, red was determined in a range in which x was 0.50 to 0.74 and y was 0.20 to 0.35, green was determined in a range in which x was 0 to 0.23 and y was 0.40 to 0.84, and blue was determined in a range in which x was 0.16 to 0.30 and y was 0 to 0.30. To be noted, the CIExy chromaticity diagram as illustrated in FIG. 11 is supposed to represent color development in a coordinate system by colored expression. However, in FIG. 11 of the present embodiment, for the sake of convenience of using black and white expression for illustration, coordinate ranges that respective colors of white (achromatic color), red, green, and blue occupy are indicated by showing letters such as "W", "R", "G", and "B" in the chromaticity diagram.

(Display of Image in Air)

Figure 3:
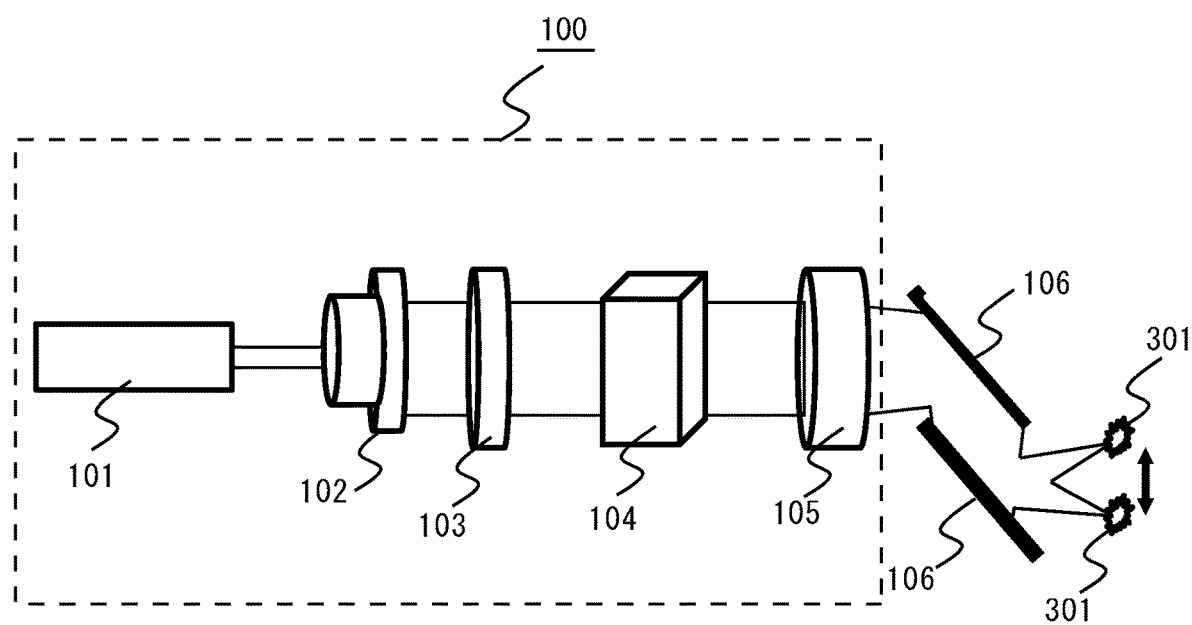
FIG. 3 is an explanatory diagram illustrating a configuration example in which moving image display or three-dimensional image display is performed by the display apparatus according to the embodiment of the present invention.

In the case of forming an image in the air by scanning by a laser, the laser radiation device 100 as illustrated in FIG. 3 can be used. As two mirror devices 106 illustrated in FIG. 3, for example, two digital galvano scanners (for example, GM-1020 of Canon Inc.) and motor drivers thereof (for example, GC-211 of Canon Inc.) and the like can be used. Usually, the diameter of a colored laser beam is increased by the beam expander 102, and the light is focused by the condenser lens 105 having a focal length corresponding to a desired display position. As a result of this, a visible image, that is, a colored display image that is not white is formed at the display position 301.

In addition, if the mirror device 106 that moves the focused point to a desired position is provided in the optical path, an image can be drawn in the air. For this mirror device 106, a galvano mirror, a polygon mirror, or the like can be used. In addition, in the case of performing 2D/3D image display in the air, a zoom lens or a movable lens that changes the focal length can be used for selecting the distance to the display position. To be noted, for these control for the display position, a configuration different from the examples described above may be used.

To be noted, in a situation such as the living body sensor 107 illustrated in FIG. 1 has directional sensitivity, a following device is provided. The following device is configured to change the detection direction of the living body sensor 107 (object detection device) in accordance with the change in the radiation optical axis by the scanning device in the case of moving the display position in a scanning manner in a three-dimensional space.

(Spectral Irradiance)

A spectral curve was measured by disposing the spectrometer 7 (108) at an angle of 45° from the optical axis direction of the condenser lens 105 while changing the laser output by using a green laser light source (L1). Further, the spectral irradiance was measured by the spectrometer 7 (108) at each observation angle illustrated in FIG. 2.

At this time, a laser beam is radiated, and the energy of the focused portion is adjusted by comparing the Y value of each of 522 nm to 542 nm of the light emitting body and the Y value of the plasma while changing the energy of the focused portion by a polarizing plate and a beam splitter. The measurement position of the light emitting body was set in the direction of 45° from the optical axis direction of the condenser lens 105 and in a distance of 50 mm from the light emitting body. In this case, the laser output was 1500 mW. In this condition, a green light emitting body was recognized when the observation direction was in the range of 30° to 330°.

In addition, results of calculating the xy values of this light emitting body from X, Y, and Z (these X, Y, and Z include scattered laser light and plasma light emission) are shown in FIG. 13. As illustrated in FIG. 13, in this example, light emission that is all in a green range (in green, x is 0 to 0.23 and y is 0.40 to 0.84) was visually recognized. As described above, a light emitting body having a light emission color of a laser (for example, green) instead of white can be visually recognized by an observer depending on how to choose the ratio of the Y value of the plasma light of the light emitting body and the Y value near the laser wavelength.

In addition, in an observation direction of an angle of 20° (left end in FIG. 13), although the color was green, light of about 500 nm was observed in addition to 532 nm, which was the main wavelength of the laser. Not pure green but a color that was a mixture of two colors was observed, and the xy values thereof were also slightly shifted toward blue. If colors are mixed in this manner, adjustment of color becomes difficult in the case of performing full-color image display using red, green, and blue, and therefore in the present embodiment, when the radiation direction (optical axis direction of the condenser lens 105) is set as 0, observation angles within the range of ±30° therefrom are not used. In addition, setting the radiation direction as 0°, the range of ±30° therefrom is a range approximately right in front of the laser radiation direction, and also from the viewpoint of protecting the observer, particularly the retina thereof, the observation angle is restricted in this range. For this, as described above, a blocking device such as a blocking wall, a blocking plate, a light shielding plate, or the like that restricts the view angle of the audience (observer group) that visually recognizes the display to a range of 30° to 135° and 225° to 330° is disposed.

To be noted, in the range of 30° to 135° and 225° to 330° from the optical axis direction of the condenser lens 105, the observed color is not white even in the case where the Y value of the light emission of only the plasma light is larger than 95% of the Y value of the scattered light of the visible laser light excluding the plasma light in the front scattering direction. This is because the phenomenon described above occurs and white plasma light is not generated. In addition, in the case of forming a green display pixel in the irradiation condition of FIG. 13, hardly any noise was generated. For example, a sound pressure level measured at a position in a distance of 1 m from the light emitting point by a precision noise meter (for example, TYPE 6224 manufactured by Aco) was 40 dB or less. In addition, it was possible to draw an image in the air by green display pixels by moving the laser light in a scanning manner by a galvano mirror in the apparatus of FIG. 3.

In addition, in the range of 30° to 135° and 225° to 330° from the optical axis direction of the condenser lens 105, the radiant energy density of the scattered light was measured in a distance of 100 mm from the light emitting body by the spectrometer 108 at angles shown below. The measurement results are as follows:

at 45° (=315°) and a distance of 100 mm, 200 µW/cm$^2$/nm or less;

at 90° (=270°) and a distance of 100 mm, 100 µW/cm$^2$/nm or less; and at 135° (=225°) and a distance of 100 mm, 80 µW/cm$^2$/nm or less.

The spectrometer 108 used at this time was a high-speed spectrometer of a fiber probe type that measured the irradiance of the light emitting body for each wavelength, for example, AvaSpec-ULS2048CL manufactured by Avantes.

Here, for reference, a green laser pointer (JIS C6802 Class 2) was used, and measurement was performed by using the spectrometer 108 in the radiation direction of 0° (=directly viewed in a laser propagation direction) and in a distance of 100 mm. It can be seen that, in this case, the spectral irradiance (radiant energy density) was 400 KµW/cm$^2$/nm. As a result of this, it can be seen that the radiant energy density of the scattered light at an observation angle of 45° (=315°) and in a distance of 100 mm from the light emitting body is $\frac{1}{20000}$ of the radiant energy density of the case of directly looking at the green laser pointer (Class 2). In addition, it can be seen that the radiant energy density of the scattered light at an observation angle of 135° (=225°) and in a distance of 100 mm from the light emitting body is $\frac{1}{40000}$ of the radiant energy density of the case of directly looking at the green laser pointer (Class 2).

(Protection Space)

As described above, in the case of a light emitting body formed by irradiation at a laser output of 1500 mW, in an observation angle range of 45° (=315°) to 135° (=225°), when the distance from the light emitting body was 100 mm, the irradiance of the scattered light was relatively low. From this, it can be understood that a configuration in which an observer observes the display position (light emitting body) from the side with respect to the radiation direction of the laser light (traveling direction of the laser light from the light source toward the light emitting body) has a possibility of suppressing stoppage of display performed for safety of the observer.

However, for example, if the intensity of the laser light is modulated in accordance with luminance information of an image signal or the like, there is a possibility that a space (range) that the laser light scattered by the light emitting body reaches at excessively high intensity is generated around the light emitting body, and moreover, the size of the space can change if the laser light intensity is modulated. From the viewpoint of protecting the observer, controlling the stoppage and continuation of display by just detecting the presence or absence of a person at the display position (plasma generation position) where laser light is focused as in Japanese Patent Laid-Open No. 2015-156080 is not sufficient. That is, it is desirable that the display is controlled by detecting not only the display position (plasma generation position) where laser light is focused but also the presence of a person in a space that the laser light scattered in the display position and the laser light having passed the display position can reach at high intensity and entrance of a person into the space.

For example, it is desirable that a space where the intensity of the scattered light scattered in various directions from the light emitting body at the display position is equal to or higher than predetermined irradiance (radiant energy density) is set as a protection space (predetermined space) and an object (living body) entering the protection space is detected.

Further, in the case where entrance or presence of an object into or in the protection space is detected, a protection mode in which radiation of laser light from the laser radiation device 100 is stopped or the laser output of the laser radiation device 100 is reduced is executed.

Here, the measurement results described above, that is, the measurement results of the irradiance in the angle range of 45° (=315°) to 135° (=225°) from the optical axis direction of the condenser lens (traveling direction of the laser light from the light source toward the light emitting body) and in the distance of 100 mm from the light emitting body are reevaluated. The irradiance was relatively high on the front side of the light emitting body and the irradiance was lower on the side and on the rear side than on the front side with respect to the radiation direction of the laser light (traveling direction of the laser light toward the light emitting body). That is, with respect to the position of the light emitting body, in a direction at 45° (=315°) with respect to the radiation direction of the laser light (traveling direction of the laser light from the light source toward the light emitting body), the irradiance of the scattered light was 200 µW/cm$^2$/nm, which was relatively high. In contrast, in a direction at 90° (=270°) with respect to the radiation direction of the laser light (traveling direction of the laser light from the light source toward the light emitting body), the irradiance of the scattered light was 100 µW/cm$^2$/nm, which was low. In addition, in a direction at 135° (=225°) with respect to the radiation direction of the laser light (traveling direction of the laser light from the light source toward the light emitting body), the irradiance was 80 µW/cm$^2$/nm, which was even lower than in the direction at 90° (=270°).

Here, positions where the irradiance of the scattered light is the same depending on the observation angle, that is, points that are in different distances from the light emitting body will be considered. For example, whereas the irradiance in a position at an angle of 135° (=) 225° and in a distance of 100 mm from the light emitting body is 80 µW/cm$^2$/nm, in the case where the observation angle is 90° (=270°), the distance from the light emitting body is larger than 100 mm in a position where the same irradiance is obtained. In addition, the distance from the light emitting body in the position where the same irradiance is obtained is even larger in the case where the observation angle is 45° (=315°) than in the case where the observation angle is 90° (=270°).

Similarly, a range where the irradiance of the scattered light is equal to or higher than a predetermined value is obtained for each observation angle, and a space serving as a collection of these is set as a protection space. That is, an irradiance that should not be exceeded for securing the safety of a human body is set as a predetermined value, and the protection mode is executed in the case where a person enters the protection space, which is a range where the irradiance is equal to or higher than the predetermined value.

In FIG. 7, the outer edge of the protection space 404 is indicated by a solid line. The shape of the protection space 404 is a shape of a rotary member having the radiation optical axis of the laser light as a central axis, and the diameter of the protection space 404 is larger in a position farther from the light emitting body (display position 301) toward the front side along the radiation optical axis. To be noted, although the protection space 404 is illustrated as a shape whose diameter is relatively small on the rear side of the display position 301 and relatively large on the front side of the display position 301 in FIG. 7, this is merely an example. The shape, size, and position of the protection space 404 can change in accordance with irradiation conditions such as the intensity, irradiation position, and focusing conditions of the laser light, and for example, may be determined by calculation by the CPU 1601 in accordance with the irradiation conditions of the laser light.

To determine the protection space 404, for example, the irradiance is measured for each direction of the observation angles on the basis of measurement that has been performed in advance, and a function or table data is obtained by interpolation on plotted data of the irradiance. The CPU 1601 can calculate the shape and size of the space where the irradiance is the predetermined value on the basis of this function or table data. In this case, the CPU 1601 calculates the shape and size of the protection space in accordance with at least one of the laser pulse width of the laser radiation device 100, the repetition frequency of the laser pulse, the beam diameter of the laser light, and the focal length. In addition, in the case where the shape of the protection space is changed, the irradiation condition of the laser light can be changed on the basis of the changed shape of the protection space. For example, the mirror devices 106 can change the direction of the radiation optical axis on the basis of the changed shape of the protection space to change the display position 301. In addition, in the case where the shape of the protection space is changed, the control device determines, on the basis of the changed shape of the protection space, the size of the image drawn (formed) in the air. Further, by changing the scanning distance of the laser light by the mirror devices 106, an image can be displayed in the display position 301 in the determined size.

In addition, for example, employing the irradiance of 80 $\mu W/cm^2/nm$ at 135° (=) 225° on the rear side of the optical axis described above as the predetermined irradiance defining the outer edge portion of the protection space (minimum value of the irradiance in the protection space) can be considered. However, a value in an arbitrary range such as a range from several tens of $\mu W/cm^2$ to several hundreds of $mW/cm^2$ may be employed in accordance with product specifications by one skilled in the art as the predetermined or certain irradiance value defining the outer edge portion of the protection space.

In addition, displaying a light emitting body of an arbitrary display color in the display position or in the vicinity thereof by additive mixing of three primary colors of R, G, and B can be considered. In this case, there is a possibility that, for example, the laser output of the laser radiation device 100 of each color of R, G, and B varies depending on a desired display condition. As a result of this, there is a possibility that the shape and size of the protection space mutually differs for each color of R, G, and B. In this case, combining the protection spaces calculated for the respective colors of R, G, and B and setting the outermost outer edge thereof as the overall shape of the protection space for three-color composite display of R, G, and B can be considered.

For example, the intensity of scattered light of the laser light of each color may be added up, and a spatial range where the scattered light intensity that has been added up is equal to or higher than the irradiance (predetermined value) that should not be exceeded for securing safety for a human body may be set as the protection space.

To be noted, a space 4041 having a conical shape through which collimated laser light 403 traveling from the condenser lens 105 toward the display position 301 passes may be also included as a part of the protection space. In addition, as described above, it is preferable that the observation view field is restricted by a blocking device or the like as described above in a 60° narrow angle range of 330° to 0° to 30° having the radiation optical axis as a center. However, in the case of performing control of the protection mode based on object (living body) detection described below, there is a possibility that this blocking device can be omitted.

In the display apparatus of the present embodiment, the protection mode is realized by the following control.
(Detection Step)

Entrance of an object into a space where the intensity of the laser light radiated from the laser radiation device 100 and the laser light scattered in the display position or having passed the display position is equal to or higher than the predetermined value is detected. For example, entrance of a living body into the protection space and presence of a living body in the protection space is detected by using the living body sensor 107.
(Protection Control Step)

In the case where entrance of an object into the space described above is detected, radiation of the laser light from the laser radiation device 100 is stopped, or the laser output of the laser radiation device 100 is reduced. In the case where entrance of a living body into the protection space or presence of a living body in the protection space is detected, transition to the protection mode is performed such that the shape and position of the protection space are changed by changing the irradiation condition of the laser light. At this time, the irradiation condition of the laser light is changed such that the living body is no longer present in the changed protection space. Change of the irradiation condition of the laser light performed in the protection mode can include radiation stoppage of the laser light, reduction of the radiation intensity, change of the radiation (focusing) position, and change of the size and shape of the displayed image.

Whereas the radiation of the laser light may be immediately stopped after the transition to the protection mode, steps S14 and S16 that will be described later may be repeated while reducing the radiation intensity, changing the radiation (focusing) position, changing the size and shape of the displayed image, or the like. According to this method, the frequency of stopping the display for protecting a living body (observer) can be suppressed, and therefore protection of an observer and practicality of the display can be both achieved at the same time.

Figure 6:
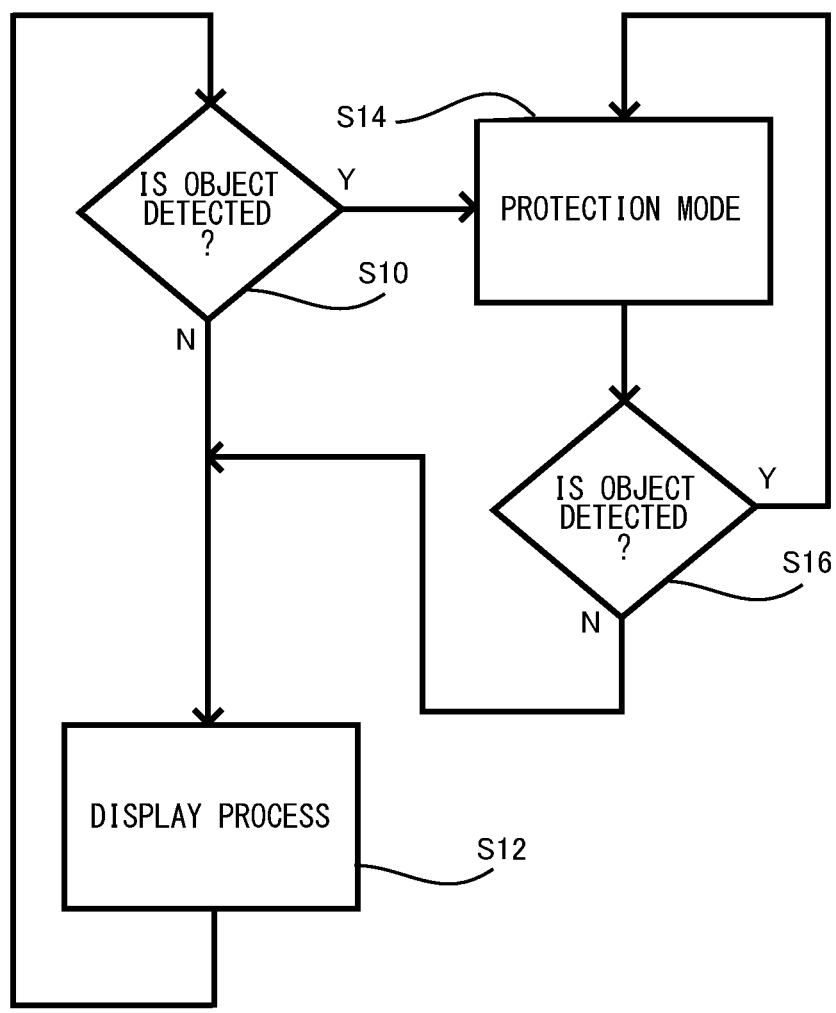
FIG. 6 is a flowchart illustrating a flow of display control according to the embodiment of the present invention.

FIG. 6 is a flowchart illustrating an example of a display control procedure according to the present embodiment including the protection mode. In step S12 illustrated in FIG. 6, a display process in which laser light is radiated from the laser radiation device 100 toward the display position is indicated. This display process (S12) may include a laser scanning process performed by a scanning device as illustrated in FIG. 3. In addition, while the display process (S12) is progressing, an object detection step of step S10 is repeatedly performed.

The object detection step (S10) is executed by, for example, the living body sensor 107 (FIG. 1) provided as an object detection device. This living body sensor 107 determines whether or not an object, a living body in this case, has entered the range of, for example, the protection space 404 of FIG. 7. When the living body sensor 107 has detected that a living body has entered the range of the protection space 404 (S10: YES), transition from step S10 to step S14 occurs, and the protection mode is executed.

In this protection mode (protection control step), for example, radiation of the laser light from the laser radiation device 100 is stopped, or the laser output of the laser radiation device 100 is reduced. The shape of the protection space is changed in accordance with the changed radiation condition of the laser light, and the object detection step by the living body sensor 107 is performed on the changed protection space in step S16.

Then, in the case where a living body is still detected in the range of the protection space in the object detection step (S16), the protection mode (S14) and the object detection step (S16) are repeatedly executed. When the living body is not detected in the object detection step (S16) (S16: NO), transition from step S16 to step S12 occurs, and the display process is resumed.

According to the protection mode control described above, in the case where an object (living body) has entered the range of the protection space 404, processing such as stopping the radiation of the laser light from the laser radiation device 100 or reducing the laser output of the laser radiation device 100 can be performed. As a result of this, damage to an object in a display environment can be prevented, and a living body, for example, the skin or retina of an observer can be reliably protected. As described above, the protection space 404 is calculated to have such a shape that the irradiance (light intensity) related to radiation and scattering of the laser light is a predetermined value in the outer edge surface thereof, and the irradiance is higher in the inside thereof. Therefore, an object or a living body can be reliably protected from exposure to radiated or scattered laser light having light intensity of a certain value or higher.

To be noted, the present invention is not limited to the embodiment described above, and can be modified and combined in many ways within the technical concept of the present invention.

Display control using the protection mode related to the protection space can be applied to a display apparatus that radiates laser light to a display position irrespective of the laser display system (method) thereof. As a laser display system that can implement the configuration and control of the present embodiment, for example, a system that generates a plasma by using a laser of an invisible wavelength range and displays a visible image by plasma light thereof can be considered. In addition, the configuration and control of the present embodiment can be also implemented by a system that colors, with visible laser light, fluctuation of a gas generated by laser light of an invisible wavelength range. In addition, the configuration and control of the present embodiment can be also applied to another system that generates plasma light by high-output laser light and uses the plasma light for display. Since the present embodiment described above and these display systems are the same in that laser light is scattered in the display position to irradiate various directions, the control of the protection mode using the protection space of the present embodiment can be performed in a similar manner.

To be noted, the display apparatus implementing the present invention can be installed in various facilities such as conference rooms, theaters, and classrooms.

In addition, the display apparatus implementing the present invention can be mounted on a moving object such as a drone to display an image in the air.

In addition, if the display apparatus implementing the present invention is mounted on a vehicle such as an automobile, an image can be displayed in a space around the vehicle for the purpose of, for example, presenting an image for supporting driving to a driver or presenting information such as warning to a pedestrian who is an observer of the image.

In addition, the display apparatus implementing the present invention can be also incorporated in an image forming apparatus serving as a multifunctional apparatus having multifunctionality as a copier, a printer, a scanner, a facsimile machine, and the like. In the case of incorporating the display apparatus in an image forming apparatus, it is possible to display an operation screen or a job list image in the air, display a printing image in the air, or newly generating printing data by modifying the printing image displayed in the air.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A display apparatus comprising:
   a laser radiation device configured to radiate laser light to a display position in a gas to form a plasma in the display position;
   a control device configured to determine a space on a basis of the display position and intensity of the laser light scattered in the display position or having passed the display position; and
   an object detection device configured to detect presence or absence of an object in the space,
   wherein, in a case where the object detection device has detected the object in the space, the control device stops or reduces an output of the laser radiation device and changes a position or a shape of the space.

2. The display apparatus according to claim 1, wherein the control device determines a position or a shape of the space in accordance with at least one of laser output, laser pulse width, laser pulse repetition frequency, laser light beam diameter, and focal length of the laser radiation device.

3. The display apparatus according to claim 1, wherein a shape of the space is a rotary member having a radiation optical axis of the laser light as a central axis.

4. The display apparatus according to claim 1, wherein the control device controls radiation intensity of the laser light radiated by the laser radiation device and intensity of light at an outer edge portion of the space.

5. The display apparatus according to claim 1, wherein the object is a living body, and
   wherein the object detection device is a living body sensor.

6. The display apparatus according to claim 1, wherein the laser radiation device comprises a scanning device configured to change a direction of a radiation optical axis of the laser light to change the display position.

7. The display apparatus according to claim 6, further comprising a following device configured to change a detection direction of the object detection device in accordance with the change in the radiation optical axis by the scanning device.

8. The display apparatus according to claim 6, wherein, in a case where a shape of the space has been changed, the control device determines a size of an image to be generated, on a basis of the changed shape of the space.

9. The display apparatus according to claim 1, wherein the laser radiation device comprises a visible light laser light source, a beam expander configured to increase a beam diameter of the laser light output from the visible light laser light source, and a focusing device that focuses the laser light whose beam diameter has been increased by the beam expander on the display position.

10. The display apparatus according to claim 1, further comprising a blocking device configured to restrict a direction in which display is visually recognized by an observer to an angle range of 30° to 330° with respect to a radiation direction of the laser light from the laser radiation device.

11. A display apparatus comprising:
a laser radiation device configured to radiate laser light to a display position in a gas to form a plasma in the display position;
a control device configured to determine a space on a basis of the display position and intensity of the laser light scattered in the display position or having passed the display position;
an object detection device configured to detect presence or absence of an object in the space; and
a measurement unit configured to measure energy density of the laser light radiated by the laser radiation device at the display position,
wherein the control device controls radiation intensity of the laser light on a basis of the energy density measured by the measurement unit.

12. The display apparatus according to claim 11, wherein, in a case where the object detection device has detected the object in the space, the control device stops or reduces an output of the laser radiation device and changes a position or a shape of the space.

13. The display apparatus according to claim 11, wherein the laser radiation device comprises a visible light laser light source, a beam expander configured to increase a beam diameter of the laser light output from the visible light laser light source, and a focusing device that focuses the laser light whose beam diameter has been increased by the beam expander on the display position.

14. The display apparatus according to claim 11, further comprising a blocking device configured to restrict a direction in which display is visually recognized by an observer to an angle range of 30° to 330° with respect to a radiation direction of the laser light from the laser radiation device.

15. The display apparatus according to claim 11, wherein the laser radiation device comprises a scanning device configured to change a direction of a radiation optical axis of the laser light to change the display position.

16. The display apparatus according to claim 11, wherein the control device controls intensity of light at an outer edge portion of the space.

17. A display apparatus comprising:
a laser radiation device configured to radiate laser light to a display position in a gas to form a plasma in the display position;
a control device configured to determine a space on a basis of the display position and intensity of the laser light scattered in the display position or having passed the display position; and
an object detection device configured to detect presence or absence of an object in the space,
wherein the control device controls radiation intensity of the laser light from the laser radiation device on the display position such that a Y value of plasma light emitted from the plasma is within a range of 1% to 95% of a Y value of scattered light of the laser light in a case where light intensity at the display position is converted into XYZ tristimulus values of CIE 1931 for each 1 nm of wavelength in a wavelength range of the laser light.

18. The display apparatus according to claim 17, further comprising a blocking device configured to restrict a direction in which display is visually recognized by an observer to an angle range of 30° to 330° with respect to a radiation direction of the laser light from the laser radiation device.

19. A control method for a display apparatus comprising a laser radiation device configured to radiate laser light to a display position in a gas to form a plasma in the display position, the control method comprising:
detecting in which an object detection device detects presence or absence of an object in a space determined on a basis of the display position and intensity of the laser light scattered in the display position or having passed the display position; and
controlling in which, in a case where the object detection device has detected the object in the space, a control device stops or reduces an output of the laser radiation device and changes a position or a shape of the space.

20. A non-transitory computer-readable recording medium storing a control program that causes a computer constituting the control device to execute each step of the control method for the display apparatus according to claim 19.

* * * * *